Jan. 27, 1942.  P. FISCHER  2,270,942

STEREOPTICON SLIDE

Filed April 14, 1941

Inventor
PHILIP FISCHER
by Henry Heck
Attorney

Patented Jan. 27, 1942

2,270,942

UNITED STATES PATENT OFFICE 2,270,942

STEREOPTICON SLIDE

Philip Fischer, Chicago, Ill.

Application April 14, 1941, Serial No. 388,365

3 Claims. (Cl. 88—27)

The invention relates to stereopticon slides which comprise transparent disks provided with markings, pictures or symbols adapted to be inserted in a projection machine for display on a screen.

It is an object of the invention to provide a slide which along its marginal portion is provided with representations or pictures so that a driving force may be imparted to the slide at its center and the projection be carried out at the marginal portion of the slide.

A further object constitutes the provision of means for arresting the disk at predetermined positions upon cessation of the driving force.

Other and equally important objects will appear from a perusal of the invention which comprises the means described in the following specification, particularly pointed out in the claims forming a part thereof, and illustrated in the accompanying drawing, in which:

Figure 1:
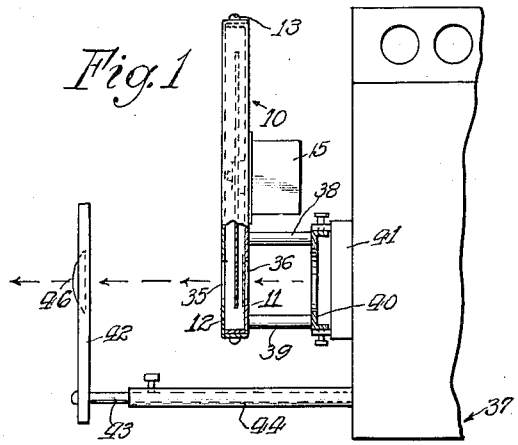
Fig. 1 is a side view of my improved slide mounted in a projection apparatus.
Figure 2:
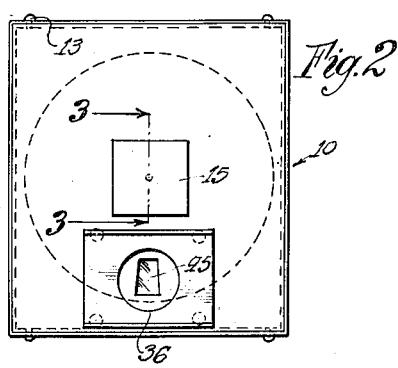
Fig. 2 is a rear view of the slide.
Figure 4:
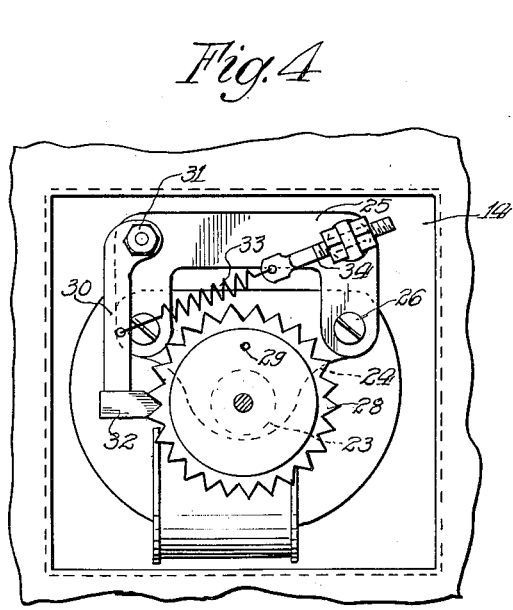
Fig. 4 is a section on the line 4—4 of Fig. 3.
Figure 3:
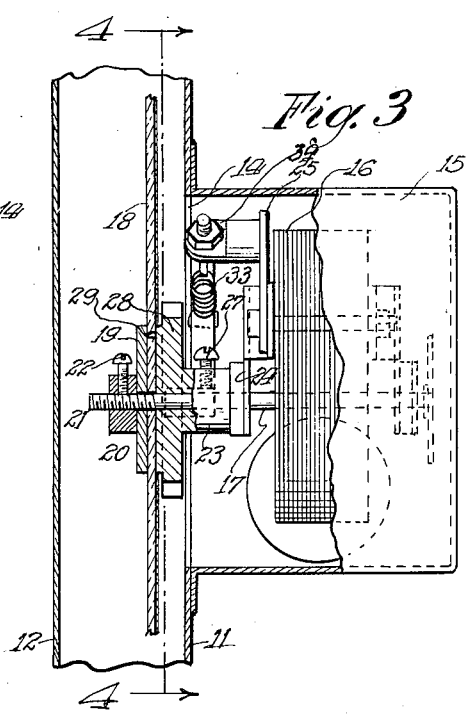
Fig. 3 is an enlarged section on the line 3—3 of Fig. 2.
Figure 5:
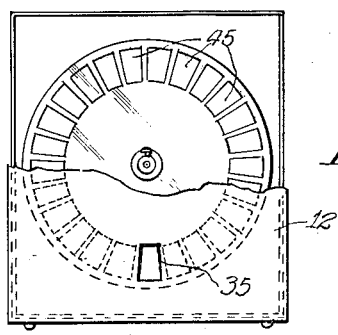
Fig. 5 is a front view of the slide, parts being broken away to disclose interior construction.

Referring to the views in the drawing the stereopticon slide generally designated by 10 comprises a rectangular box-like casing 11 closed by a cover 12 which is secured in position by a plurality of screws 13.

The casing has a large opening 14 covered by a box 15 secured to the casing in any approved or convenient manner. An induction motor 16 is placed in the box 15 and its shaft 17 extends into the casing 11. A transparent disk 18 is mounted on the shaft for rotation therewith. To this end a washer 19 is held against the front face of the disk 18 by a nut 20 on the threaded end 21 of the shaft 17 and a set screw 22 holds the nut against rotation.

A bearing member 23 is secured to a bracket 24 depending from a yoke member 25 secured by screws 26 to the field of the motor 16. A set screw 27 secures the bearing 23 to the shaft. A ratchet wheel 28 is formed integral with the bearing 23 and bears against the rear face of the disk 18. A pin 29 projects from the ratchet wheel through an aperture in the disk so that in installing the disk its representation on the marginal portion is in proper position with the passage of the light rays hereinafter described.

An arm 30 is pivotally secured to the yoke member 25 as at 31 and has a wedge member 32 adapted to engage the teeth of the ratchet wheel. One end of a spring 33 is secured to an intermediate portion of the arm 30 while the other end is secured to a turnbuckle 34 mounted on the yoke member 25 so that the wedge member 32 is yieldingly held in engagement with the teeth of the ratchet wheel.

The casing 11 and cover 12 are provided with an opening 35 and 36 respectively, which openings are in alignment to expose a marginal portion of the disk 18 and serve as a passage for light rays emanating from a projector generally designated by 37.

The casing 11 is provided with rods 38 and 39 to which is secured a plate 40 adapted to be slid into a holder 41 on the projector. A holder 42 for a stereopticon lens 46 is supported by a rod 43 adjustably protruding from a tubular member 44 secured to the projector.

In use the disk having representations or symbols 45 near its periphery and in circular arrangement is mounted so that the pin 29 enters an aperture in the disk 18 whereby a picture or other markings are in alignment with the openings 35 and 36.

Upon energizing the motor which may be any kind of motor the disk is rotated and the various pictures are projected. Upon turning off the motor the disk finally comes to a stop and the wedge member 32 by its engagement with the ratchet wheel cause the disk to come to a stop in a position where a complete picture is in alignment with the openings 35, 36.

While the drawing shows one embodiment of the invention various changes and alterations may be made without departing from the purview of the invention.

I, therefore, do not limit myself to the details of construction and arrangement of parts as shown but include all changes, modifications and variations constituting departures within the scope of the invention as defined in the claims.

I claim:

1. A unit for detachably securing to the housing of a projector, comprising a casing open at the front and provided with a central opening at the rear, a cover closing said casing, said cover and said casing having aligned openings for the passage of light, a box secured to said casing to form a housing around the central opening, a motor in said casing extending with its rotor shaft into said casing, and a transparent disk in said casing fast on said rotor shaft and adapted to present a circular row of markings or symbols successively to said aligned light passing openings.

2. For use with a projector, a unit adapted to be detachably mounted on said projector, said unit comprising a casing provided with a central rear opening and aligned openings near the periphery for the passage of light, a housing around said central casing opening, a motor in said housing extending with its rotor shaft into said casing, and a transparent disk in said casing fast on said rotor shaft and adapted to present a circular row of markings or symbols successively to said aligned light passing openings.

3. For use with a projector, a unit adapted to be detachably mounted on said projector, said unit comprising a casing provided with a central rear opening and aligned openings near the periphery for the passage of light, a housing around said central casing opening, a motor in said housing extending with its rotor shaft into said casing, a transparent disk in said casing fast on said rotor shaft and adapted to present a circular row of markings or symbols successively to said aligned light passing openings, and means for arresting said disk at predetermined positions upon cessation of the motor drive.

PHILIP FISCHER.